(12) United States Patent
Wang et al.

(10) Patent No.: US 11,420,183 B2
(45) Date of Patent: Aug. 23, 2022

(54) METHOD OF PREPARING CARBON-BASED SULFUR-LOADING IRON-CONTAINING ADSORBENT FOR MERCURY REMOVAL

(71) Applicants: Taiyuan University of Technology, Shanxi (CN); China Shenhua Coal to Liquid & Chemical Co., ltd., Beijing (CN)

(72) Inventors: Jiancheng Wang, Shanxi (CN); Qihuang Huo, Shanxi (CN); Huijun Chen, Shanxi (CN); Lina Han, Shanxi (CN); Geping Shu, Beijing (CN); Liping Chang, Shanxi (CN); Weiren Bao, Shanxi (CN)

(73) Assignees: Taiyuan University of Technology, Taiyuan (CN); China Shenhua Coal to Liquid & Chemical Co., ltd., Beijing (CN)

(*) Notice: Subject to any disclaimer, the term of this patent is extended or adjusted under 35 U.S.C. 154(b) by 231 days.

(21) Appl. No.: 16/833,545

(22) Filed: Mar. 28, 2020

(65) Prior Publication Data
US 2020/0238252 A1 Jul. 30, 2020

Related U.S. Application Data

(63) Continuation of application No. PCT/CN2019/086835, filed on May 14, 2019.

(30) Foreign Application Priority Data

Dec. 10, 2018 (CN) .................. CN201811501935

(51) Int. Cl.
*B01J 20/20* (2006.01)
*B01D 53/02* (2006.01)
(Continued)

(52) U.S. Cl.
CPC .............. *B01J 20/20* (2013.01); *B01D 53/02* (2013.01); *B01J 20/0266* (2013.01);
(Continued)

(58) Field of Classification Search
CPC .... B01J 20/20; B01J 20/0266; B01J 20/3071; B01J 20/3078; B01J 20/3085;
(Continued)

(56) References Cited

U.S. PATENT DOCUMENTS 4,708,853 A 11/1987 Matviya et al.
5,710,092 A * 1/1998 Baker .................. C01B 32/348
502/416

FOREIGN PATENT DOCUMENTS

| CN | 101687173 A | 3/2010 |
| CN | 107051391 A | 8/2017 |
| CN | 109499533 A | 3/2019 |

OTHER PUBLICATIONS

CN-107051391-A English Translation (Year: 2017).*
(Continued)

*Primary Examiner* — Anita Nassiri-Motlagh

(57) ABSTRACT

This invention introduces a method of preparing a carbon-based sulfur-loading iron-containing adsorbent for mercury removal, which can solve the problems in the prior art that sulfur-rich heavy organic materials have low-value utilization and the elemental mercury in atmosphere is hard to be efficiently and economically removed by the existing mercury removal agents. A carbon-based sulfur-loading iron-containing adsorbent for mercury removal is prepared in this invention. The adsorbent with a porous structure is prepared in situ by performing steps such as chemical activation of sulfur-rich heavy organic materials that are rich in iron. The adsorbent prepared herein has good mercury removal performance in simulated coal-fired flue gas. This invention not only improves the utilization value of sulfur-rich heavy
(Continued)

organic materials, but also prevents $SO_x$ pollution caused by the combustion of sulfur-rich heavy organic materials and controls mercury pollution in the coal-fired flue gas.

7 Claims, 2 Drawing Sheets

(51) Int. Cl.
  *B01J 20/02* (2006.01)
  *B01J 20/30* (2006.01)
  *B01J 20/32* (2006.01)
  *C10K 1/32* (2006.01)

(52) U.S. Cl.
  CPC ....... *B01J 20/3071* (2013.01); *B01J 20/3078* (2013.01); *B01J 20/3085* (2013.01); *B01J 20/3234* (2013.01); *C10K 1/32* (2013.01); *B01D 2257/602* (2013.01); *B01D 2258/0283* (2013.01); *B01J 2220/4875* (2013.01)

(58) Field of Classification Search
  CPC ................ B01J 20/3234; B01D 53/02; B01D 2257/602; B01D 2258/0283
  USPC ........................................................ 502/437
  See application file for complete search history.

(56) References Cited

OTHER PUBLICATIONS

University of Illinois at Urbana-Champaign, "Unlikely Mix Used tires, Pistachio Shells can Clean up Pollution", Science Daily, Aug. 2, 2000. (Year: 2000).*
Chowdhury et al., "Process Variables Optimization for Preparation and Characterization of Novel Adsorbent from Lignocellulosic Waste", 2012, BioResources 7(3), 3732-3754. (Year: 2012).*
J.R. Hatch and R.H. Affolter, Resource Assessment of the Springfield, Herrin, Danville, and Baker Coals in the Illinois Basin, Professional Paper 1625-D, Version 1.0, 2002. (Year: 2002).*

* cited by examiner

METHOD OF PREPARING CARBON-BASED SULFUR-LOADING IRON-CONTAINING ADSORBENT FOR MERCURY REMOVAL

CROSS-REFERENCE TO RELATED APPLICATIONS

This application is a continuation of International Patent Application No. PCT/CN2019/086835, filed on May 14, 2019, which claims the benefit of priority from Chinese Application No. 201811501935.2, filed on Dec. 10, 2018. The content of the aforementioned applications, including any intervening amendments thereto, are incorporated herein by reference.

TECHNICAL FIELD

The present application relates to coal chemical application, and more particularly to a method of preparing a carbon-based sulfur-loading iron-containing adsorbent for mercury removal.

BACKGROUND OF THE INVENTION

High-sulfur coal, an important coal resource, is abundant in China. However, it is hard to be efficiently utilized in a clean way, which is the biggest challenge that high-sulfur coal faces. Based on the national conditions of China, coal will be still the primary non-renewable energy in the foreseeable future. Coal liquefaction technology is considered as one of the important clean means to efficiently utilize coal, but a large amount of residue is generated during the process of coal liquefaction. The coal liquefaction residue with high sulfur has the limited development and utilization at now. Currently, the residue is mainly utilized through combustion, during which a large amount of sulfur oxides is generated, resulting in environmental pollution. In recent years, as the increasing amount of high sulfur crude oil imported from the Middle East and wide promotion of delayed coking technique in China, the sulfur content in petroleum coke also has increased continuously which greatly restricts the subsequent utilization of the petroleum coke. The coal liquefaction residue and the petroleum coke above are regarded as sulfur-rich heavy organic matters.

Currently, high-sulfur coal is usually washed to remove part of sulfur-containing substances before the utilization, and the remaining sulfur is treated through desulfurizing during the combustion or desulfurization of flue-gas before the emission. The coal liquefaction residue can be utilized through techniques of hydrogenation liquefaction, gasification and pyrolysis coking, but these techniques are immature and still being researched. Currently, the coal liquefaction residue is re-used through combustion, which faces the same environmental problems as high-sulfur coal. The petroleum coke with an increased sulfur content also causes many problems, such as the declined quality of petroleum coke products, excessive flue-gas emissions and equipment corrosion, leading to national restrictions on the trade of high-sulfur petroleum coke. Extensive utilization of these sulfur-rich heavy organic substances may aggravate the environmental pollution in China, such as smog and acid rain. A new approach is required to fundamentally solve the environmental pollution caused by the utilization of the sulfur-rich heavy organic substances.

Nowadays, environmental problems are constantly highlighted. In addition to the problems of $SO_X$ and $NO_X$, heavy metal pollution gradually becomes the focus of global attention, in which mercury pollution problem is becoming increasingly prominent and has received close attention. A global convention "the Minamata Convention on Mercury" entered into force in 2017. According to the US Environmental Protection Agency survey, coal-fired flue gas is the largest source of global mercury emission, with mercury emissions accounting for more than 30% of totals. Most areas of China are located in the north temperate zone, where people keep warm by burning a number of coals in cold winters. Most of the power plants are thermal power plants. Two billion tons of coal are consumed each year in China, and the flue-gas emitted by industrial boilers and generators is great source of the mercury pollution. Therefore, the mercury removal from coal-fired flue gas can be an important measure to prevent atmospheric mercury pollution.

Mercury exists in the atmosphere in three forms: particulate mercury ($Hg^p$), oxidized mercury ($Hg^{2+}$) and elemental mercury ($Hg^0$). In order to solve atmospheric mercury pollution, researchers have developed a variety of effective techniques based on the characteristics of mercury to prevent and control mercury pollution. These techniques include mercury removal technique of dust removal equipment, adsorbent mercury removal technique, catalytic oxidation technique and others. Particulate mercury can be collected by dust removal facilities. Oxidized mercury, which is soluble in water and prone to adhere to particles, can also be collected and removed using conventional pollutant control equipment, such as wet flue gas desulfurization device, electrostatic precipitator (ESP), inertial dust collector and bag dust collector. However, since the elemental mercury is insoluble in water, chemically stable and volatile, the existing pollutant control equipment is not effective to elemental mercury removal. If elemental mercury can be oxidized to divalent mercury, it is easy to be removed. Mercury removal technique of dust removal equipment is mature to be applied, including bag dust collectors and electrostatic dust collectors. Adsorbent mercury removal technologies (including activated carbon, fly ash, calcium-based adsorbents and mineral adsorbents) and catalytic oxidation technique are current research hotspots, which aim to obtain high-performance and low-cost adsorbent preparation technologies.

Chinese Patent Publication No. 107051391 A disclosed a sulfur-rich activated carbon adsorbent doped with bromine for flue-gas mercury removal and a method of preparing the same. The technical solution provided herein adopted petroleum coke as a raw material, KOH as an activator, and performed activation treatment in a mixed atmosphere of $N_2$ and $H_2$, and then the adsorbent was chemically modified with $NH_4Br$ to improve the chemisorption of mercury. However, the adsorbent was required to be activated and impregnated with $NH_4Br$ during the preparation, which needed additional steps in the filtration and drying causing the increased preparation cost of adsorbent. Moreover, although vulcanization process was not required in the preparation, $NH_4Br$ involved harsh transportation and storage conditions. Slightly toxic $NH_4Br$ solution may contaminate waters. Undiluted or large quantities of $NH_4Br$ products could not be introduced to groundwater, watercourses, sewage systems and surrounding environment without government permission.

Chinese Patent Publication No. 105148840 A disclosed a fly ash adsorbent for flue-gas mercury removal. The adsorbent consisted of 40-50 parts by weight of fly ash, 4-5 parts by weight of ferric nitrate, 3-4 parts by weight of manganese acetate, 13-15 parts by weight of glass fiber, 5-7 parts by weight of sodium silicate, 3-4 parts by weight of sodium tartrate, 5-6 parts by weight of calcium oxide, 5-6 parts by weight of chitin, 0.3-0.5 part by weight of borate coupling agent and deionized water. The technical solution was as follows. Firstly, the fly ash was washed and then mixed with ferric nitrate and manganese acetate followed by calcination to obtain a mixture. Next, the glass fiber, the sodium tartrate and the calcium oxide were added to the mixture to form a slurry followed by spray drying to obtain the adsorbent. This technical solution is complicated, especially the processes of the washing of the fly ash, the acid leaching, the glass fiber pretreatment and the slurry making and spraying process greatly increase the manufacturing cost of the adsorbent.

Chinese Patent Publication No. 104888713 A disclosed a volcanic rock adsorbent for flue-gas mercury removal and a method of preparing the same. The adsorbent consisted of 8-15 parts by weight of calcium carbonate fiber, 20-40 parts by weight of tetrabutyl titanate, 3-5 parts by weight of silicon Sol, 6-8 parts by weight of calcium aluminate, 60-80 parts by weight of volcanic rock, 6-9 parts by weight of PA6 nylon powder, 3-4 parts by weight of gelatin, 1-3 parts by weight of ammonium bicarbonate, 3-5 parts by weight of polyacrylamide, 5-8 parts by weight of 13× molecular sieve and an appropriate amount of ionized water. The technical solution provided herein were as follows. Firstly, calcium carbonate glass fiber gel was prepared, then the volcanic rock was leached with sulfuric acid for 12 h, finally, pelletizing and two-step roasting were performed. These processes take a long time and increase the manufacturing cost. In addition, there were no specific embodiments to illustrate the mercury removal effect of the adsorbent.

SUMMARY OF THE INVENTION

This invention aims to solve the technical problems that sulfur-rich heavy organic materials have low utilization value and the elemental mercury in atmosphere is hard to be removed by the existing mercury removal sorbents. This invention provides a preparation method of a carbon-based sulfur-loading iron-containing adsorbent for mercury removal. This technique refuses traditional utilization methods of the sulfur-rich organic materials, and adopts chemical activation to make the sulfur-rich organic materials into the carbon-based sulfur-loading iron-containing adsorbent for mercury removal to improve the utilization value of the sulfur-rich organic materials and remove elemental mercury from coal-fired flue gas.

The invention adopts the following technical solutions.

A method for preparing a carbon-based sulfur-loading iron-containing adsorbent for mercury removal, comprising:

(1) drying, grinding and sieving a sulfur-rich heavy organic matter with a sulfur content more than 1% to obtain sulfur-rich heavy organic particles;

(2) preparing potassium hydroxide (KOH) and the sulfur-rich heavy organic material obtained in step (1), respectively, according to a mass ratio of KOH to the sulfur-rich heavy organic material of less than or equal to 3:1;

(3) mixing the KOH and the sulfur-rich heavy organic material prepared in step (2) uniformly to obtain a mixture; dropwise adding an aqueous ethanol to the mixture for infiltration;

(4) placing the infiltrated mixture obtained in step (3) in a tubular furnace to perform the calcination and activation under the protection of $N_2$, thereby obtaining an activated product; and (5) washing and filtering the activated product with hot water repeatedly until a pH of a filtrate is 7, and drying the product to obtain the carbon-based sulfur-loading iron-containing adsorbent for mercury removal.

In step (1), the sulfur-rich heavy organic matter is high sulfur coal or coal liquefaction residue.

In step (1), a drying temperature is 60-110° C.

In step (1), a mesh number of a sieve used during the sieving is 20 mesh or less.

In step (3), the aqueous ethanol is a solution of absolute ethanol and water mixed in a volume ratio of 2:8, and a ratio of a volume of the aqueous ethanol to a mass of the sulfur-rich heavy organic material is 0.4-1.5 mL/g.

In step (4), the calcination and activation are performed at 400-1000° C. for 1-5 h.

In step (5), a temperature of the hot water is 50-100° C., and a drying temperature is 110° C.

The beneficial effects of the invention are described as follows.

(1) The method of preparing an adsorbent for mercury removal in the invention is simple and highly feasible, and the raw materials required are extensive. The carbonization and activation are completed in one step. Moreover, the utilization value of the sulfur-rich organic materials is improved, and the atmospheric mercury pollution is prevented to some extent.

(2) A mercury removal test over the adsorbent prepared by this invention was carried out in a fixed-bed experimental device. The results showed that the adsorbents showed excellent mercury removal performance in the atmospheres of $N_2+O_2$ and simulated coal-fired flue gas at 120° C., 150° C. and 180° C.

(3) The mercury removal technology provides a new idea for the high value-added utilization of sulfur-rich heavy organic substances. In this invention, the carbon-based sulfur-loading iron-containing adsorbent for mercury removal is prepared using the sulfur in the sulfur-rich heavy organic materials and its own iron element, which alleviates the mercury pollution released from the coal-fired flue gas and improves the utilization value of the sulfur-rich heavy organic materials. This invention provides not only a new approach for high value-added utilization of sulfur-rich heavy organic materials, but also a novel adsorbent for the mercury pollution treatment of the coal-fired flue gas, combining advantages of the efficient utilization of resources and environmentally friendly development.

DETAILED DESCRIPTION OF EMBODIMENTS

Example 1

Figure 1:
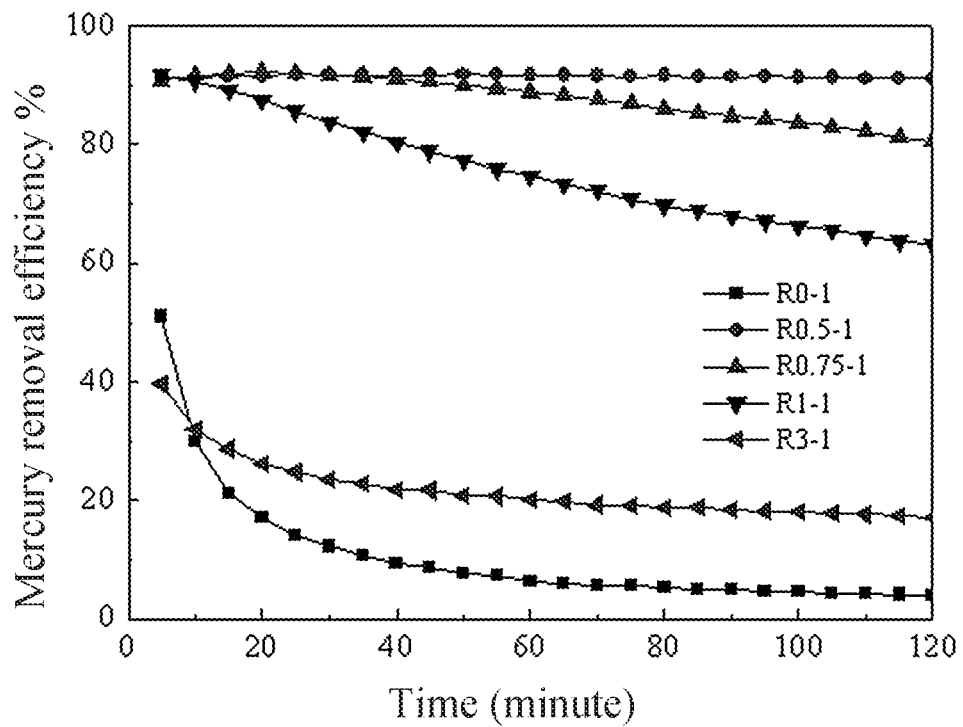
FIG. 1 is a graph showing an effect of an alkali-carbon ratio on the efficiency of mercury removal.

ZunYi (ZY) high-sulfur coal, which contained 6.4% by weight of sulfur and 3.5% by weight of iron, was selected as an experimental raw material. The ZY high-sulfur coal was dried in a drying oven at 110° C. for 8 h, then ground and sieved by a 40-60 mesh sieve to obtain ZY coal particles for use.

Five solid mixtures were prepared by uniformly mixing the components as follows:

Solid mixture 1: 10 g ZY coal particles;
Solid mixture 2: 10 g ZY coal particles and 5 g KOH;
Solid mixture 3: 10 g ZY coal particles and 7.5 g KOH;
Solid mixture 4: 10 g ZY coal particles and 10 g KOH;
Solid mixture 5: 10 g ZY coal particles and 30 g KOH.

A mixed solution of absolute ethanol and water in a volume ratio of 2:8 was dropwise added into the five solid mixtures by a pipette, respectively, to produce five infiltrated solid mixtures (R0-1, R0.5-1, R0.75-1, R1-1, R3-1).

The five infiltrated solid mixtures were placed in a programmed tubular furnace for the calcination and activation at 800° C. for 2 h to produce resulting samples.

The resulting samples were washed by 50° C. hot water followed by filtering repeatedly until a pH of filtrate was 7, and then the filtered samples were dried to obtain carbon-based sulfur-loading iron-containing adsorbents for mercury removal.

Example 2

ShenHua (SH) coal liquefaction residue, which contained 1.22% by weight of sulfur and 2.24% by weight of iron, was selected as an experimental raw material. The SH coal liquefaction residue was dried in a drying oven at 60° C. for 12 h, then was ground and then was sieved by a 60-80 mesh sieve to obtain coal liquefaction residue particles for use.

Five solid mixtures each were prepared by mixing 5 g coal liquefaction residue particles and 10 g KOH uniformly, where the coal liquefaction residue particles and KOH were weighted using a balance.

A mixed solution of absolute ethanol and water in a volume ratio of 2:8 was dropwise added into the four solid mixtures by a pipette, respectively, to produce five infiltrated solid mixtures.

The five infiltrated solid mixtures were respectively placed in a programmed tubular furnace for the calcination and activation at 400° C., 500° C., 600° C., 700° C. and 800° C. for 2 h to produce five resulting samples (T400, T500, T600, T700, T800).

The resulting samples were washed by 100° C. hot water followed by filtering repeatedly until a pH of filtrate was 7, and then the filtered samples were dried to obtain carbon-based sulfur-loading iron-containing adsorbents for mercury removal.

Example 3

The carbon-based sulfur-loading iron-containing adsorbents for mercury removal prepared in Examples 1 and 2 were separately placed in a fixed-bed experimental device to continuously perform a mercury removal test for 2 h at a temperature of 120, 150 or 180° C. under $N_2+O_2+Hg^0$ (40 μg/m$^3$) or simulated coal-fired flue gas which included $N_2$, $O_2$, $SO_X$, $NO_X$, $Hg^0$ (40 μg/m$^3$) with a total gas volume of 1 L/min ($N_2$ was used as balance gas). The simulated coal-fired flue gas was introduced into a reaction tube to contact with the adsorbents. The loading amount of the adsorbents was 1.5±0.1 mL and the particle size of the adsorbents after sieving by a 40-60 mesh sieve was 0.25-0.42 mm.

The mercury removal test was carried out on a fixed-bed reactor through the following steps.

Quartz wool was laid in the reaction tube, and a blank value was calibrated as a concentration value of mercury at an inlet of the fixed-bed reactor; 1.5 mL adsorbents was measured and filled into the fixed-bed reactor. After a temperature in the fixed-bed reactor was stable, the mercury removal test of the adsorbents was performed under the simulated coal-fired flue gas.

The mercury removal performance of carbon-based sulfur-loading iron-containing adsorbents was evaluated and defined by a mercury removal efficiency of elemental mercury, that was, $\eta$ (%)=$(1-C_1/C_0) \times 100\%$, where $\eta$ was the mercury removal efficiency of the adsorbents, and $C_1$ and $C_0$ were mercury concentrations at the inlet and the outlet of the fixed-bed reactor, respectively, and the units of $C_1$ and $C_0$ were μg/m$^3$ or ppm.

The concentration of $Hg^0$ was measured by a LUMEX 915M mercury analyzer which could record one data every 1 minute. A plurality of average values were calculated by using data every 5 minutes to create a dot-line graph. FIGS. 1-4 showed the mercury removal performance of samples under different test conditions.

Figure 2:
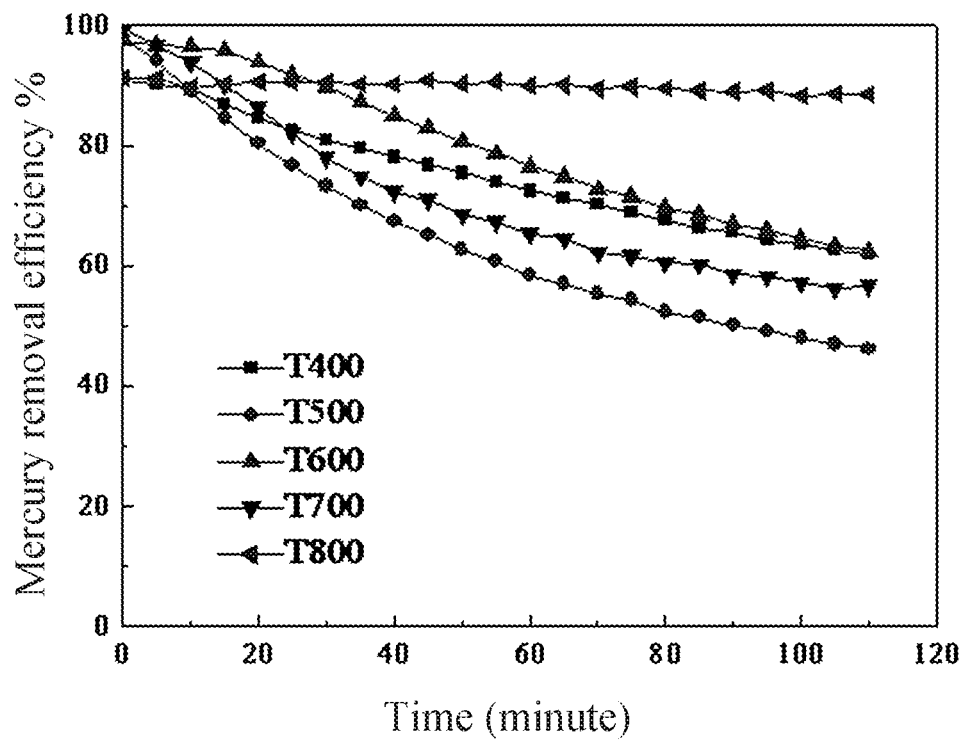
FIG. 2 is a graph showing an effect of an activation temperature on the capacity of mercury removal.
Figure 4:
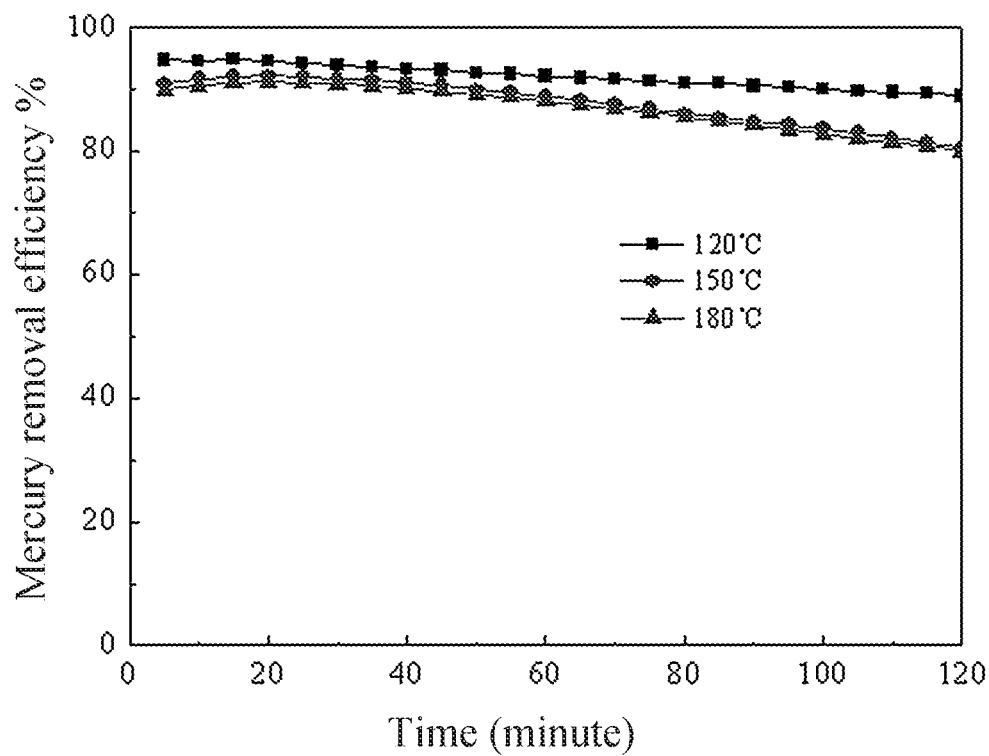
FIG. 4 is a graph showing an effect of a temperature of a fixed-bed experimental device on the efficiency of mercury removal.

Test conditions of FIGS. 1, 2 and 4 were 150° C., 40±2 μg/m$^3$ $Hg^0$, $N_2$+4% $O_2$, a space velocity of 40000 h$^{-1}$.

Figure 3:
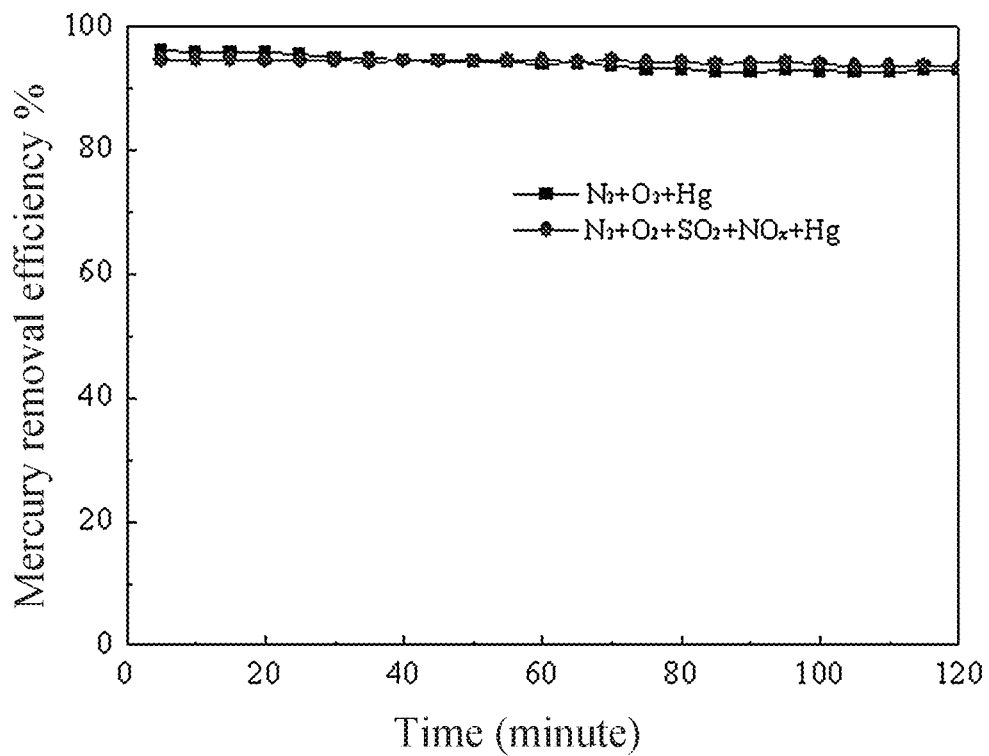
FIG. 3 is a graph showing an effect of atmosphere on the mercury removal performance.

FIG. 3 is a graph showing the test results of the sample T800 under a test condition of 40±2 μg/m$^3$ $Hg^0$, a space velocity of 40,000 h$^{-1}$.

FIG. 4 is a graph showing the test results of the sample R0.5-1.

Example 4

SH coal liquefaction residue, which contained 1.22% by weight of sulfur and 2.24% by weight of iron, was selected as an experimental raw material. The SH coal liquefaction residue was dried in a drying oven at 90° C. for 12 h, then was ground and then was sieved by a 200-400 mesh sieve to obtain SH coal liquefaction residue particles for use.

Three solid mixtures each were prepared by mixing 10 g SH coal liquefaction residue particles and 5 g KOH uniformly, where the SH coal liquefaction residue particles and KOH were weighted using a balance.

A mixed solution of absolute ethanol and water in a volume ratio of 2:8 was dropwise added into the three solid mixtures by a pipette to produce three infiltrated solid mixtures.

The three infiltrated solid mixtures were placed in a programmed tubular furnace for the calcination and activation at 1000° C. for 1 h, 3 h and 5 h respectively to produce three resulting samples (SH1, SH2 and SH3).

The resulting samples were washed by 60° C. hot water followed by filtering repeatedly until a pH of filtrate was 7, and then the filtered samples were dried to obtain carbon-based sulfur-loading iron-containing adsorbents for mercury removal.

The mercury removal adsorbents prepared above were subjected to a mercury removal experiment on an eject mercury removal device at 120° C. for 2 s, wherein a carbon/mercury ratio was 100,000 and the mercury removal efficiency of the three adsorbents was above 70%.

The experimental results showed that the adsorbents prepared herein had the high mercury removal activity at 120-180° C. under various atmospheres, where the adsorbent R0.5-1 prepared in Example 1 and the adsorbent T800 prepared in Example 2 had high mercury removal activity in $N_2$ and $O_2$ atmosphere, and the average mercury removal efficiency in 2 h was above 90%. Although the adsorbents R3-1 and T500 had a relatively low mercury removal activity, their mercury removal performance had been significantly improved compared to ZY coal without KOH activation. Predictably, an adsorbent with better mercury removal performance could be prepared by adjusting the amount of KOH, types of sulfur-rich heavy organic materials and conditions during activation. Thus, it could be concluded that the carbon-based sulfur-loading iron-containing adsorbent for mercury removal prepared in this invention had good mercury removal effect under the coal-fired flue gas, indicating that the carbon-based sulfur-loading iron-containing adsorbent for mercury removal could be prepared using the sulfur-rich heavy organic material and had immeasurable industrial application prospects in the mercury removal for the coal-fired flue gas.

What is claimed is:

1. A method for preparing a carbon-based sulfur-loading iron-containing adsorbent for mercury removal, comprising:
   (1) drying, grinding and sieving a sulfur-rich iron-containing heavy organic matter with a sulfur content more than 1% to obtain a sulfur-rich iron-containing heavy organic material;
   (2) mixing the KOH and the sulfur-rich iron-containing heavy organic material obtained in step (1) uniformly according to a mass ratio of 0.5-1:1 to obtain a mixture and dropwise adding an aqueous ethanol to the mixture for infiltration;
   (3) placing the infiltrated mixture obtained in step (3) in a tubular furnace to perform the calcination and activation under the protection of $N_2$, thereby obtaining an activated product; and
   (4) washing and filtering the activated product with hot water repeatedly until a pH of a filtrate is 7, and drying the product to obtain the carbon-based sulfur-loading iron-containing adsorbent for mercury removal.

2. The method of claim 1, wherein the sulfur-rich iron-containing heavy organic matter in step (1) is high sulfur coal or coal liquefaction residue.

3. The method of claim 1, wherein a drying temperature in step (1) is 60-110° C.

4. The method of claim 1, wherein a mesh number of a sieve used during the sieving in step (1) is 20 mesh or less.

5. The method of claim 1, wherein the aqueous ethanol in step (3) is a solution of absolute ethanol and water mixed in a volume ratio of 2:8, and a ratio of a volume of the aqueous ethanol to a mass of the sulfur-rich iron-containing heavy organic material is 0.4-1.5 mL/g.

6. The method of claim 1, wherein the calcination and activation in step (4) are performed at 400-1000° C. for 1-5 h.

7. The method of claim 1, wherein a temperature of the hot water in step (5) is 50-100° C., and a drying temperature is 110° C.

* * * * *